April 10, 1951 B. C. HARNEY 2,548,785
BAR FEED MECHANISM FOR MACHINE TOOLS
Filed May 17, 1947 5 Sheets-Sheet 3

INVENTOR:
Bernard C. Harney,
BY
Bodell & Thompson
ATTORNEYS.

April 10, 1951

B. C. HARNEY 2,548,785

BAR FEED MECHANISM FOR MACHINE TOOLS

Filed May 17, 1947

INVENTOR:
Bernard C. Harney,
BY
Bodell & Thompson
ATTORNEYS.

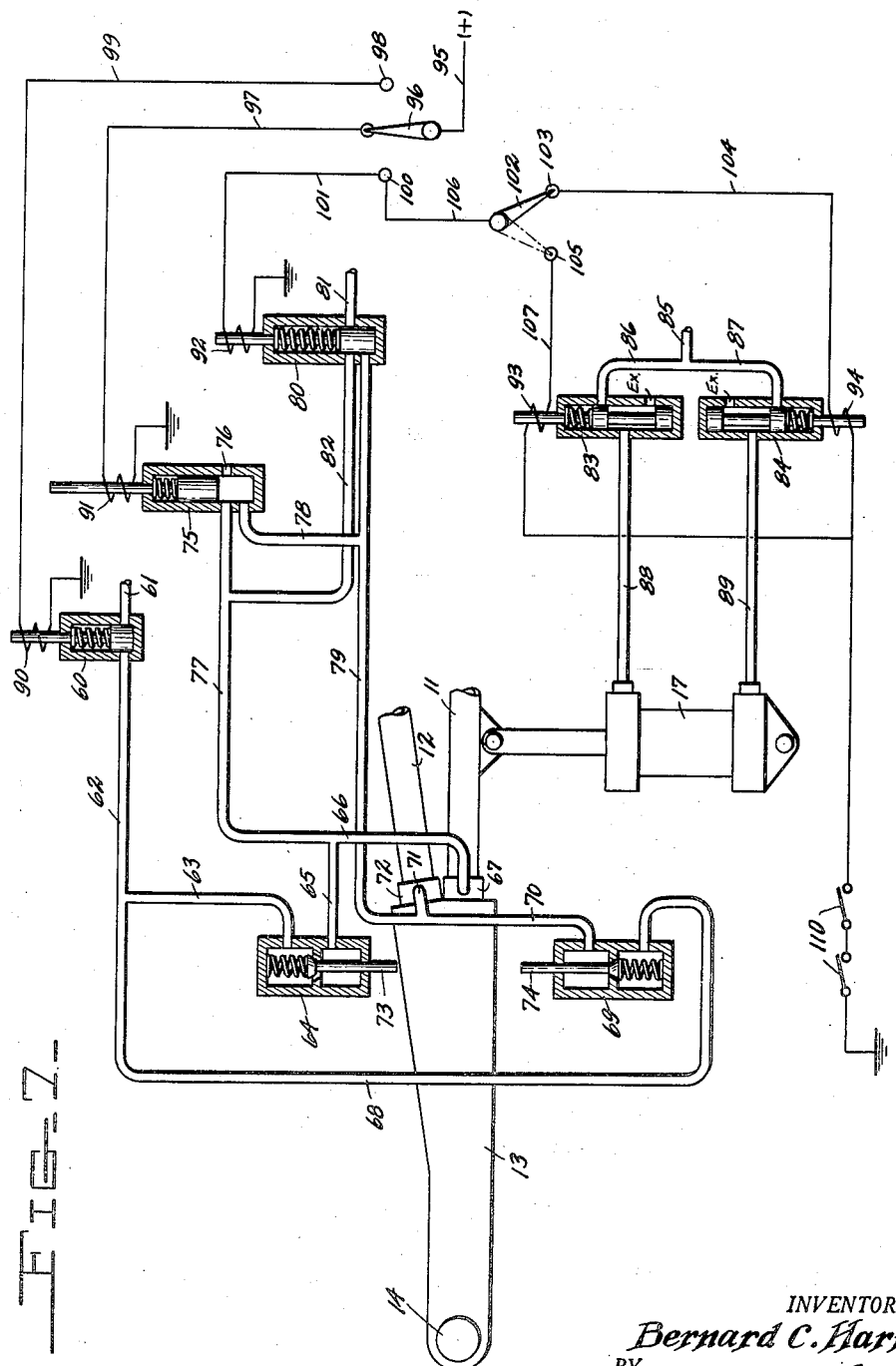

Patented Apr. 10, 1951

2,548,785

UNITED STATES PATENT OFFICE 2,548,785

BAR FEED MECHANISM FOR MACHINE TOOLS

Bernard C. Harney, Syracuse, N. Y., assignor to Lipe-Rollway Corporation, Syracuse, N. Y., a corporation of New York Application May 17, 1947, Serial No. 748,764

8 Claims. (Cl. 29—59)

This invention relates to pneumatic stock bar feeds for automatic machine tools which include a rotating spindle, or spindles, through which the bars are fed to the tools of the machine.

It has for its object a pneumatic bar feed including a pair of feed tubes through which the bars are fed by air power through the spindle and to the tools by pistons in the tubes, and a carrier or support for the tubes shiftable to carry either tube into alinement with the spindle, and the other tube out of alinement therewith, so that the tube out of alinement with the spindle can be loaded while the bar in the tube in alinement with the spindle is being fed automatically through the spindle of the machine to the tools, so that when the bar stock is used up after several finished work pieces have been machined and cut off from the bar, the carrier can be shifted to carry the loaded tube into alinement with the spindle and the empty tube out of alinement therewith into position to be loaded.

It further has for its object, a system for controlling the application of power to feed the tubes, and the application of a vacuum for withdrawing the pistons in the tube preliminary to reloading the tube, and controlling and permitting the shifting of the carrier only when the air power is cut off and the pressure behind the pistons released.

It also has for its object, a control system in which the cutting in of the air power is also controlled by the shiftable carrier when shifted to either of its positions assumed when one or the other of the tubes is alined with the spindle of the machine.

The invention consists in the novel features and in the combinations and constructions hereinafter set forth and claimed.

In describing this invention, reference is had to the accompanying drawings in which like characters designate corresponding parts in all the views.

Figure 7 is a diagrammatic view of the control system.

Figure 1:
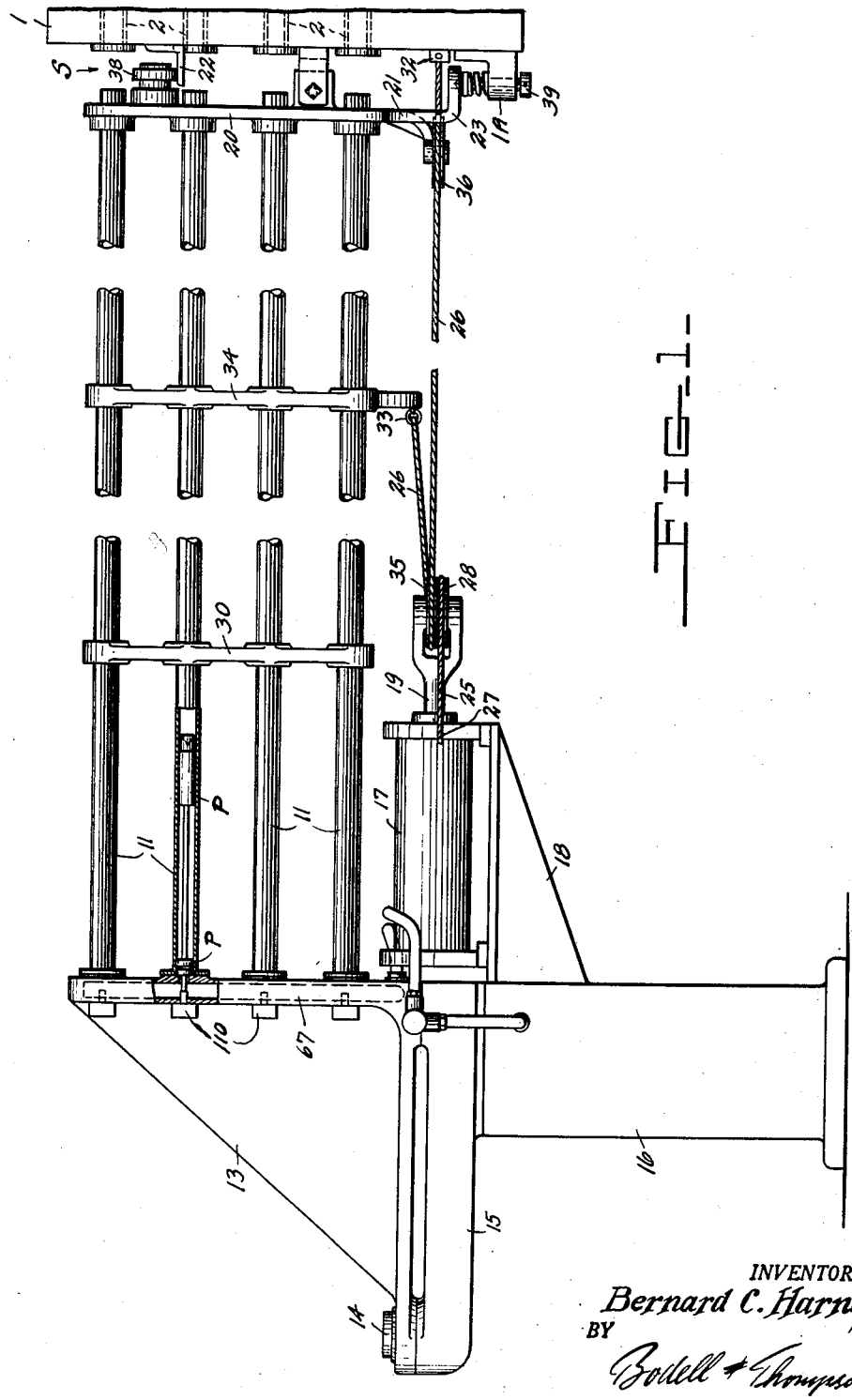
Figure 1 is a side elevation, partly broken away, of a preferable embodiment of this bar feed mechanism.

This bar feed includes, generally, at least one pair of feed tubes for the bar stock carried, or secured, at like ends to a carrier which is mounted to shift laterally, the tubes being also spaced laterally and having their outer ends, that is, their ends remote from the carrier also spaced apart laterally, push pistons in the tubes to feed the bars, the carrier being mounted relatively to the machine so that, when shifted, it will shift either tube out of alinement with the spindle, and the other tube into alinement therewith, with suitable means for shifting the carrier, and also a power or air pressure system controlled partly by the carrier, when in a position in which the power or air is applied only to the tube alined with the spindle, as by alternate operable valves opened by the carrier when in one or the other of its shifted positions, and partly by a main cut-off valve, and a control system including a master member operable into one position to open the power system to the flow of power to one or the other of the tubes, and means controlled by the master control member for operating, or permitting the operation of, the carrier shifting means only when the master control member is out of power position so that the carrier can be shifted only in proper sequence with the bar feeding operation.

The feed system includes a vacuum line for retracting the pistons in the feed tube and in hence releasing the air pressure in the tubes, this operation of the vacuum being controlled by the master control member when in vacuum position. Hence, the carrier can be shifted only when the master control is in vacuum position. The power control also preferably, but not necessarily, includes a release line cutting out the power without cutting in the vacuum, and controlled by the master control member when in an intermediate position between power and vacuum position, so that the carrier can not be shifted when in this release or exhaust position. The purpose of the release position is to facilitate the facing off of the advance end of a new bar. The ends of the bars are rough, uneven, and often on a bias, etc. After a new bar is fed upon the first feeding operation against the stop of the machine, the operator moves the master control to the intermediate release or exhaust position, loosens the collet of the machine, moves or shifts the stop out of the way, pulls out the bar a trifle, tightens the collet and starts the machine. The facing tool, which is a standard part of the equipment of the machine, cuts and faces off the rough or biased end of the new bar even with the stop during the regular operation of the machine tools. The facing operation takes place on all the remaining work pieces of that bar automatically. In automatic metal working machines, the stop or stops move out of position after stopping the bar during each feeding operation. The machine or the tools thereof, and the operation, are not part of this invention.

The machine tools may be of any suitable form, size and construction. They include a head as 1 in which a rotatable hollow spindle 2 is mounted, this having the usual collet at its inner end operated by the mechanism of the machine for gripping the bar during the machining operations. The bars are fed through the hollow spindle a predetermined distance against the stop, all as will be understood by those skilled in the art. For pneumatic bar feeds generally, reference is made to Mariotte Patent 2,339,712, January 18, 1944; Mariotte Patent 2,300,457, November 3, 1942, and Mariotte Patent 2,272,720, February 10, 1942.

In the illustrated embodiment of this bar feed, two sets of feed tubes are shown, each set including a plurality of feed tubes for feeding bar stock simultaneously to a corresponding number of spindles 2 of a multiple spindle machine tool, the spindles and tubes being here shown as arranged in a vertical row.

In pneumatic bar feeds, there is a push piston or plunger actuated by compressed air in the feed tube and usually the piston is withdrawn, when it is fed to the limit of its movement and the bar is too short for further use, by a vacuum preliminary to reloading the tube with a new bar.

In the machine here illustrated, the new bars are loaded into the tubes from the muzzle end thereof. In some machines, the tube is loaded in through the breech, as shown in Mariotte Patent No. 2,327,916, issued August 24, 1943.

The main feature of this bar feed mechanism is the arrangement of a pair of tubes, or two sets of tubes on a shiftable carrier, one tube, or set of tubes, being located and in position to feed the bars to the spindle, or spindles, and the other tube, or set of tubes, being in position to be reloaded while the machining operations are being performed on the stock bars feeding from the tubes alined with the spindle, or spindles.

As here illustrated, two sets of tubes, of four tubes in each set, are shown. The numerals 11 and 12 designate the two sets of tubes, these being shown as mounted at like ends in a carrier 13 which is mounted to shift laterally, it being here shown as pivotally mounted on an upright pivot 14 on a bed 15 supported by a base, or pedestal 16. The tubes 11 and 12 are arranged in horizontal pairs, each pair being fixed at its outer end to the carrier 13 and extending radially at different radial angles so that they diverge toward their outer ends remote from the pivot 14, that is, the ends toward the spindles 2 of the machine tool, there being a space at S between the outer ends of the tubes and the head of the machine across which space the bars are fed through the hollow spindles 2 of the machine. In each tube is located a piston P of any suitable construction, or of the construction shown in any of the patents referred to.

Figure 2:
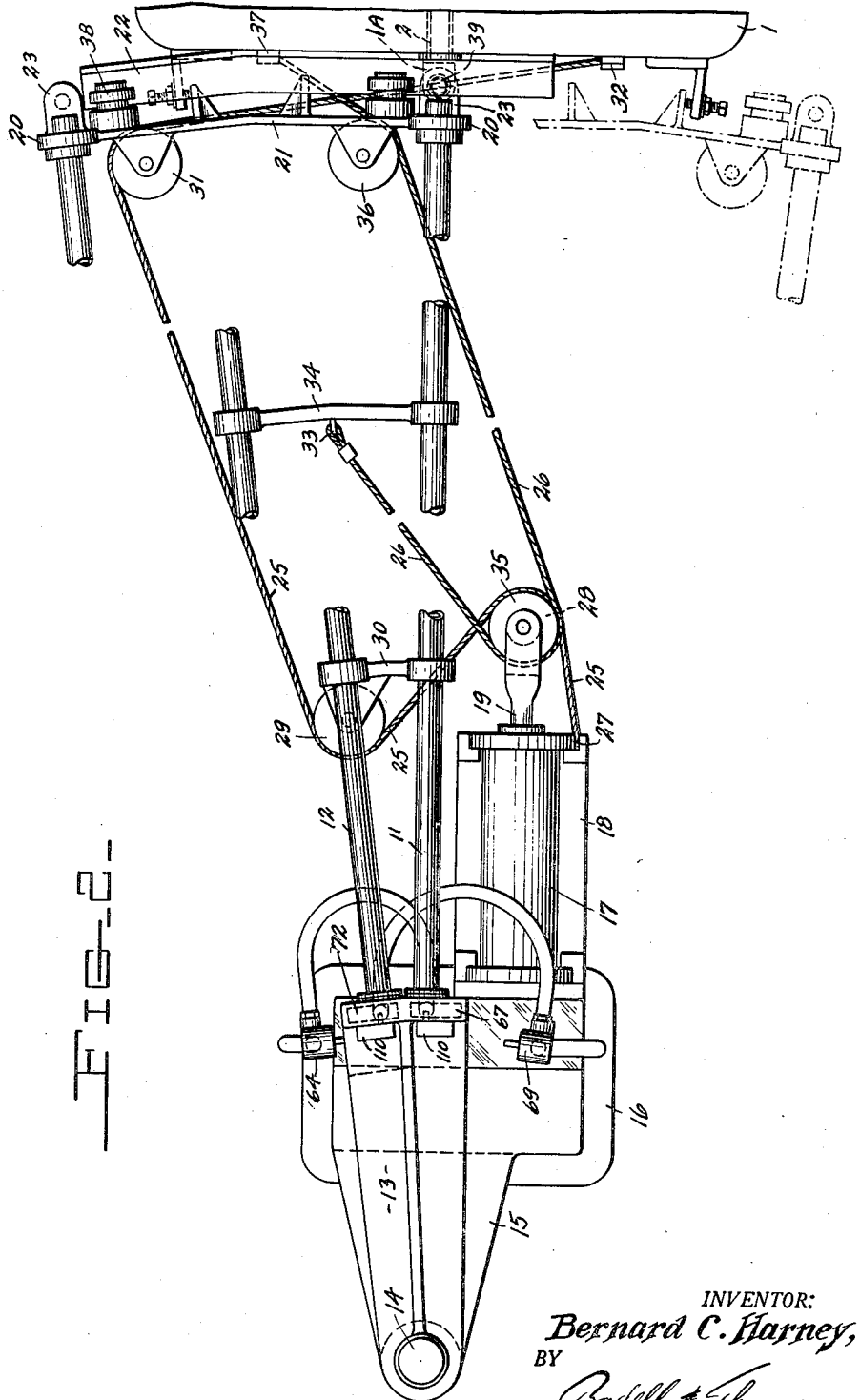
Figure 2 is a plan view, partly broken away and partly in section, of the parts seen in Figure 1.

The carrier 13 is arranged with either set of tubes, as the tubes 11, Figure 2, alined with the spindles, and with the other set, as 12, out of alinement therewith in position to be loaded with the new bars through the muzzle ends thereof. When the bars in the tubes 11 have been used up, except for a remnant too short for a work piece, the carrier 13 is shifted in one direction, as downwardly in Figure 2, to carry the empty tubes 11 out of alinement with the spindles, and the tubes 12, which have been reloaded, into alinement with the spindles. The tubes 11 are then reloaded. When the tubes 12 have been used, the carrier 13 is shifted in the opposite direction, as upwardly, to carry the now reloaded tubes 11 into alinement with the spindles, and the now empty tubes 12 into the position shown in Figure 2, where they are again reloaded. The shifting of the carrier may be effected in any suitable manner, but is preferably effected by power. As here illustrated, it is shifted by a reversible air operated motor 17 mounted on a bracket 18 on the pedestal 16, and motion transmitting means between the piston rod 19 of the motor and the outer end of the sets of tubes 11 and 12. As seen in Figures 1 and 2, the tubes of each set 11 and 12 are connected at their outer ends by a head 20, and the heads of the two sets are connected together by a cross head or brace 21, and the cross head 21 is supported on tracks 22 secured to the head 1 of the machine.

The motion transmitting means, shown in Figures 1 and 2, comprises two cables 25 and 26, the cable 25 being anchored at 27 as to the bracket 18, or the head of the cylinder of the motor 17 extending around a pulley 28 on the end of the piston rod around the pulley 29 on one of the tubes 12, or on an intermediate brace 30 connecting the bars 11, 12, and thence around a pulley 31 on the cross brace 21, to an anchor 32 on the head of the machine tool. The cable 26 is anchored at 33 to cross brace 34 between the tubes 11 and 12, thence around another pulley 35 on the end of the piston rod and coaxial with the pulley 28, and thence over a pulley 36 on the cross head 21 to an anchoring point 37 on the head of the machine tool. The arrangement is such that when the piston of the motor 17 moves in one direction or the other, one cable 25 or 26 is under tension, while the other is slack, and the sets of tubes 11 and 12 and the carrier 13 is shifted in one direction about the pivot 14 and when the piston reverses the other cable is taut and the carrier shifted in reverse direction. The cross head or brace 21 is provided with suitable antifriction means as rollers 38 movable along the tracks 22. A spring pressed poppet device 39 on a bracket 1A secured to the head 1, coacts with lugs 23 on the cross head bracket 21 when either set of tubes 11, 12, is alined with the spindles, to steady the tubes during the bar feeding operations.

Figure 3:
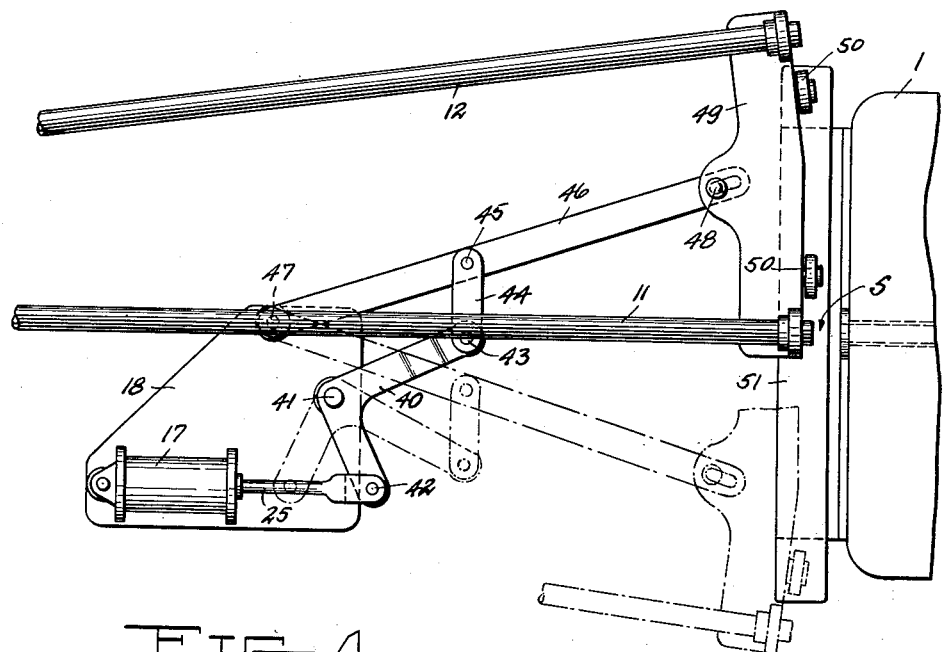
Figures 3 and 4 are fragmentary plan and side elevations of a modified form of this bar feed.
Figure 4:
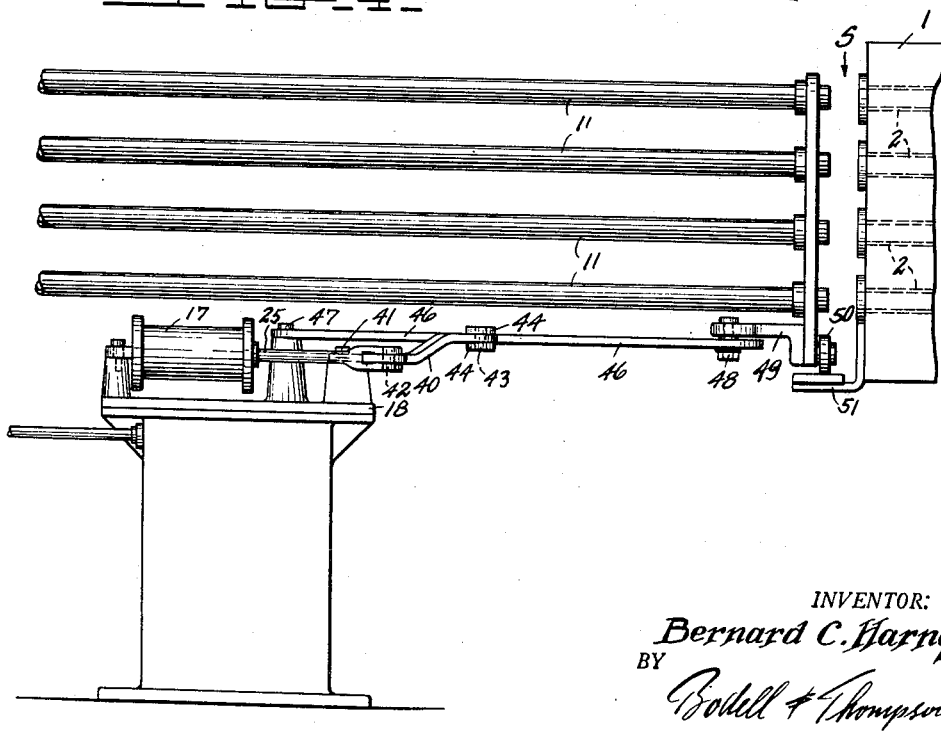

As seen in Figures 3 and 4, the motion may be transmitted from the cylinder and piston motor 17, through a lever and link mechanism including an angle lever 40 pivoted at its angle at 41 to a support, as the bracket 18, and having one arm pivoted as at 42 to the piston rod 25, and its other arm pivoted at 43 to one end of a link 44 which is pivoted at 45 at its other end to a swinging guide link 46. The guide link 46 is shown as pivoted at 47 to the support, as 18, and connected as by a pin-and-slot connection 48 at its other end to a cross head or brace 49 connecting the sets of tubes 11 and 12. This cross head or brace 49 is provided with antifriction members 50 movable along a transverse track 51 on the head 1 of the machine.

Figure 5:
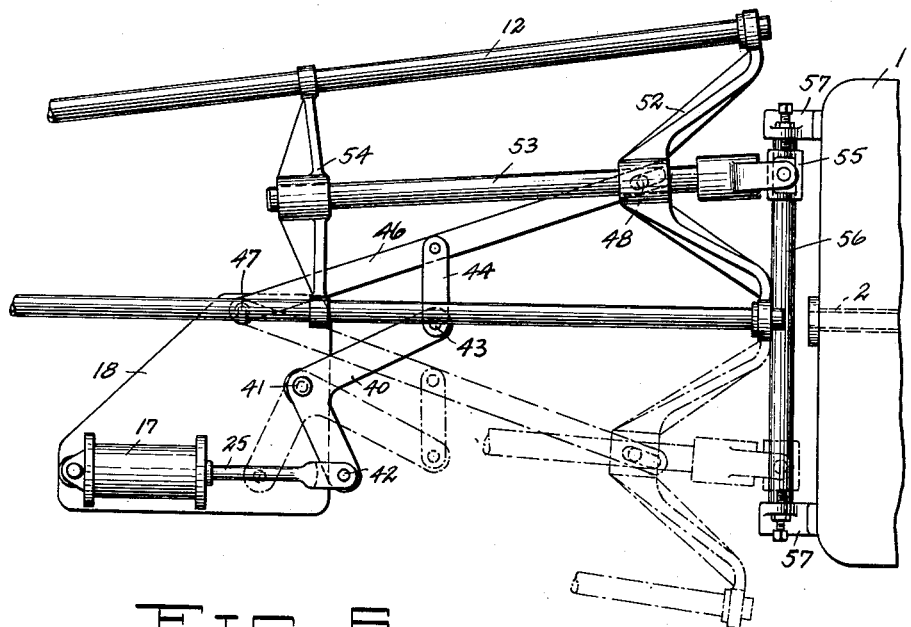
Figures 5 and 6 are fragmentary plan and side elevations of a second modified form.
Figure 6:
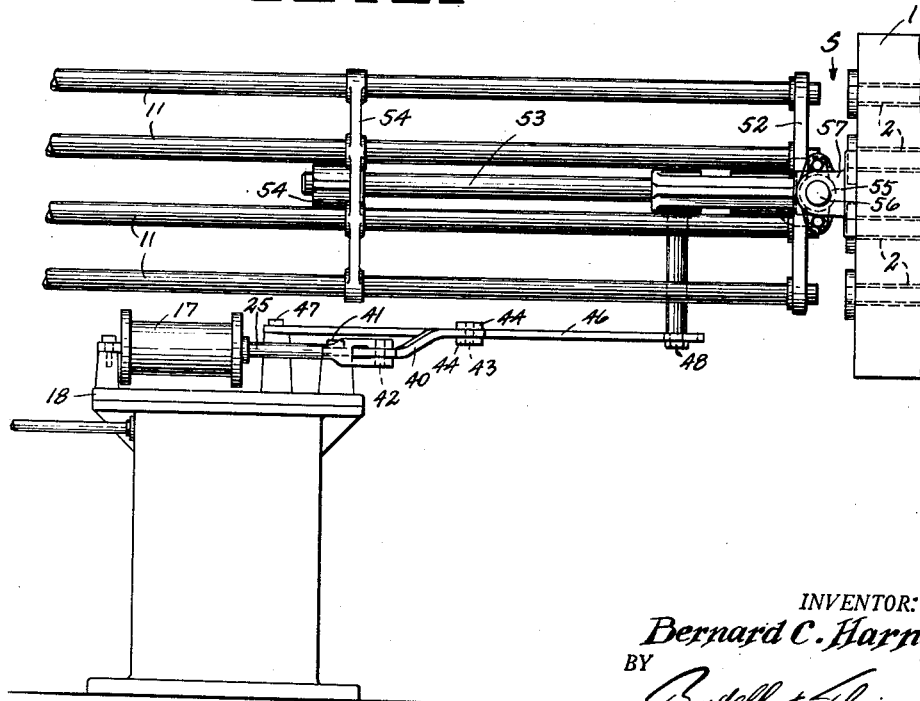

Substantially the same mechanism is shown in Figures 5 and 6. The cross head or brace 52, corresponding to the cross head or brace 21, is mounted on a rod 53 extending between the two sets of tubes, and also supported at its rear end in a transverse cross head or cross bracket 54 between the tubes 11 and 12, this intermediate rod 53 having a pivoted sleeve 55 at its front end slidable along a guide rod 56 supported on brackets 57 on the head of the machine.

The sets of tubes or the carrier 13 may be shifted by hand, or in a manner analogous to the shifting of the single tube shown in Mariotte Patent 2,300,457, November 3, 1942.

The pistons in the feed tubes are actuated in one direction to feed the bars through the spindle by compressed air. The pistons are withdrawn in order that new bars may be loaded into the tubes by vacuum, and the motor for shifting the carrier is operated by compressed air. The flow of the compressed air and the vacuum is controlled by valves. The valves are operated by an electric system including electro-responsive devices, as solenoids, connected in a control electric circuit.

The motor for shifting the carrier 13 is double acting and hence, the valves controlling the flow of motive fluid to and from the same are reversing valves. The electro-responsive devices for operating the reversing valves are connected in branches of a circuit controlled by a reversible control member or switch in a circuit which can be closed into two positions only when a master control member or switch in the circuit for the valves, which control the flow of air to the tubes and the vacuum, is in vacuum position.

The sequence of the operation is as follows. Assuming that one set of tubes, as 11, is loaded and alined with the spindles of the machine tool, the cut-off valve in an air feed line is opened, and air flows to the tubes 11 and actuates the pistons therein to feed the bars to the spindles of the machine. Some time during this period, new bars are reloaded into the tubes 12 which are out of alinement with the spindle. When the bars in the tubes 11 become too short for further feeding, the air cut off valve is closed and a valve in a vacuum line, when opened, causing a vacuum in the tubes 11 to withdraw the pistons therein to the inner ends of the tubes 11 while the vacuum valve is open. The reversing valves for the reversible motor 17 are then operated to open one and permit the air to flow to the upper end of the motor 17 and hence shift the carrier to bring the empty tubes 11 downward out of alinement with the spindles, and the loaded tubes 12 into alinement with the spindles. The shifting can take place only after the vacuum valve has been opened. The operation of the reversing valve can take place only when the pistons are at the inner ends of the tubes 11, 12. The air cut-off valve is then opened, permitting air to flow to the tubes 12 now alined with the spindles, and the sequence of operations repeated with the tubes 12 alined with the spindles. When the reverse valve is opened in the sequence, air flows to the lower end Figure 7 of the motor 17 and shifts the empty tubes 12 out of alinement with the spindles, and the now reloaded tubes 11 back into alinement with the spindles.

Referring to Figure 7, 60 designates a self closing, normally closed, cut-off valve in a supply pipe 61 for compressed air, the valve being connected through pipes 62 and 63 to a valve 64 which is connected by pipes 65 and 66 to a header passage 67 common to one set of tubes, as the tubes 11. The pipe 62 is also connected through a pipe 68 to a valve 69, similar to the valve 64, and alternately operable therewith, the valve 69 controlling the flow of air through a pipe 70 and branch 71 to a header passage 72 for the other set of tubes 12. One of the valves 64, 69, is open to the flow of air, while the other is closed, and these valves are operated by the pivotal movement of the carrier 13, they having stems 73, 74, arranged to be alternately engaged by the carrier 13 during its pivotal movement.

75 designates a valve for opening the headers 67, 72, or the tubes to the exhaust of air therefrom, this valve opening into the outer air at 76 and being connected by a pipe 77 to the pipe 66 leading to the header 67, and also to the pipe 65 connected to the valve 64. The valve 75 is also connected by a pipe 78 to a pipe 79 communicating with the pipe 70 and its branch 71. When this exhaust valve 75 is opened, or in the position shown in Figure 7, the air is free to exhaust from behind the pistons of the tubes 11 and 12 and from the valves 64 and 69. However, the pistons in the reloaded tubes about to be shifted into alinement are, at this time, retracted and hence the air exhausts only from the other or empty tubes. The exhaust valve may be omitted. It is primarily for relieving the pressure on the pistons in the tubes alined with the spindles to permit new bars to be pulled out upon loosening of the collet of the machine after the first feed of the new bars against the stops of the machine, so that their uneven or biased ends may be cut off even with the stops and faced. When pulled out, the collet is again tightened, the exhaust valve closed, and air valve 60 opened, and the automatic operations resumed.

80 designates a vacuum valve connected by a pipe 81 to an exhauster, or source of vacuum. This valve 80 is connected by a pipe 82 to the pipe 77, so that when the vacuum valve is open, the vacuum is effective in the tubes 11 and in the valve 64. The vacuum valve also is connected to the pipe 79 so that when the vacuum valve is open, the vacuum is effective in the tubes 12 and in the valve 69. It is also effective in the valve 75, through the pipe 78, but this is of no practical effect as when the vacuum valve 80 is open, the exhaust valve 75 is closed. 83 and 84 are reversing valves for the cylinder and piston motor 17. These valves are connected through a pipe 85 and branches 86 and 87 to a source of air pressure. The valves are also connected through pipes 88 and 89 to opposite ends of the cylinder and piston motor 17.

The cut-out valve 60, exhaust valve 75, vacuum valve 80, and reversing valves 83, 84, are operated by solenoids against the action of returning springs, the solenoids being designated respectively 90, 91, 92, 93 and 94.

The control circuits for the solenoids is as follows. From feed wire 95, through master control switch 96 which has three positions, it being shown in the intermediate position wherein it is in circuit through wire 97 with the solenoid 91 of the exhaust valve 75, so that the exhaust valve is open, or in the position shown in Figure 7. The solenoid 90 of the air cut-out valve 60 is in circuit with the contact 98 for the three position master switch 96, through a wire 99. When the switch 96 is engaged with the contact 98, the valve 60 will be opened and hence, air under pressure passed from the feed pipe 61, through pipes 62 and 63, through the valve 64 which is open, as seen in Figure 7, through pipes 65 and 66 to the header 67. Hence, air pressure will be applied to the header 67 for the set of tubes 11 which are in line with the spindles of the machine tool. Hence, the pistons in the tubes 11 will be actuated to feed the bars through the spindles to the tools of the machine, and when the portion of the bar being machined is finished and the tool cuts off the finished work piece, the air pressure being still on will repeatedly feed the bars in the tubes until the bars are used up or become too short for an additional work piece. If one bar runs out ahead of the others, the machine continues to run until all the bars are too short for additional work pieces. This is determined by the operator. The operator then shifts the master control switch 96 to an intermediate position so that the valve 60 again closes. This completes the circuit through the switch 96, wire 97, through the solenoid 91 for the exhaust valve 67, moving it into the open position shown in Figure 7. Thereupon, the air in the set of tubes 11 exhausts through the pipes 66 and 77 out through the open exhaust valve 75. The air also exhausts back through the open valve 64 and pipe 65, but this is ineffective as the main air valve 60 is now closed. The exhaust is also active through the exhaust valve 75, pipes 78, 79, 70, and its branch 71 in the header 72 of the tubes 12 but, as will be presently seen, the pistons are retracted in these tubes 12 which are out of alignment with the spindles and hence, the exhaust is ineffective. The valve 69 is also open to exhaust through pipes 70, 79 and 78, through the open exhaust valve 75, but this is ineffective because the valve 69 is closed, or is in the position shown in Figure 7.

As before mentioned, the valve 75 is primarily for the special purpose of permitting the shifting of new bars by hand beyond the stops of the machine in position to be cut and faced off the uneven or biased advance ends of new bars. After the cutting off of the advance ends of new bars, when this operation is necessary when performing the cutting and facing operations on the advance ends of new bars, the master control switch 96 is in its first position engaged with the contact 98. Hence, the machining operations normally continue automatically until the bars become too short for further operations. The operator then shifts the switch 96 into a third or vacuum position with contact 100 so that a circuit is completed through wire 101, to the solenoid 92, opening the vacuum valve 80. Now vacuum is created through pipes 82, 77 and 66 to the header 67 of the tubes 11, thus withdrawing the pistons to the inner ends of the tubes. As the exhaust valve 75 and air valve 60 is closed, and also as the valve 69 is closed, the vacuum through the pipes 79, 71 and 70, and through the pipe 65, valve 64, pipes 63 and 62 is ineffective. At this time, the pistons in the tubes 12, in which new bars have been loaded, have been previously retracted.

When the master switch 96 is shifted into engagement with the contact 100 of the vacuum circuit, a circuit is established through a reversing switch 102 having two positions, in one of which it is connected by a wire 104 to the solenoid 94 which operates the valve 84, and the other of which energizes the solenoid 93 which opens the valve 83. In Figure 7, it is shown as engaged with a contact 103, this being its position occupied when the motor 17 has been actuated to shift the tubes 11 and 12 into the position shown in Figure 7, in which the tubes 11 are alined with the spindles. The operations just described are preliminary to shifting the empty tubes 11 out of alined position, and the loaded tubes 12 into alined position. Upon shifting of the master switch into engagement with the contact 100, and the shifting of a reversing switch 102 to the dotted line position Figure 7, a circuit is established through wire 106, switch 102, contact 105, wire 107, and solenoid 93, thus opening the reversing valve 83. Air pressure now passes from the feed line 85, through pipe 86, valve 83, pipe 88, to the upper end of the cylinder and piston motor 17, thus shifting the carrier 13 about its pivot 14 and moving the loaded tubes 12 into alinement with the spindles, and the empty tubes 11 downwardly out of alinement with the spindles 2, or in position to be loaded with new bars.

The operator then shifts the master switch in one shift from the vacuum contact 100 to the power contact 98, thus again opening the valve 60. The shifting of the carrier 13 opens the valve 69 by reason of the carrier encountering its stem 74 and permits the valve 64 to close by reason of the carrier leaving the stem 73. Hence, with the air valve 60 open, air is now free to pass through the pipes 62, 68, open valve 69, pipe 70 and branch 71, to the tubes 12 which, as before stated, are alined with the spindles, and cause the bars to be fed through the spindles.

When these bars are used up, the operator moves the master switch 96 into vacuum position in engagement with the contact 100, whereby effective vacuum flows from the tubes 12, now alined with the spindles, through pipes 71, 79 and valve 80, thus withdrawing the pistons to the inner ends of the tubes. The operator then throws the reverse valve switch 102 into engagement with the contact 103, thus energizing the solenoid 94 for the reversing valve 84, so that air flows from the air feed pipe 85, through branch 87, valve 84, pipe 89, to the lower end of the cylinder and piston motor 17, thus shifting the carrier 13 about its pivot 14 upwardly, Figure 7, shifting the tubes 12, which are empty, and in which the pistons have been withdrawn to the inner end thereof into position to be loaded, and shifting the loaded tubes 11 again into alinement with the spindles.

In order to not close either of the branch circuits to the solenoids of the reversing valves 83, 84, until the bars in the tubes in alinement with the spindles, have been used to the shortest length, switches are provided in the reversing valve branch circuits located to be closed only when all of the pistons have been withdrawn to starting position, that is, the inner ends of the tubes. These switches are designated 110, there being preferably, for safety reasons, one for each tube, these being located to be closed by the pistons when they are withdrawn to their starting position. As the switches 110 are in series, all of them must be closed. The switches that are in the loaded tubes 11 or 12, about to be shifted into alinement with the spindles of the machine, are necessarily closed when the pistons in the set of tubes that are about to be moved out of alined position, are drawn by the vacuum back to the inner ends of the tubes. There may be but one switch for each set of tubes, that is, one switch in only one tube of each set, but preferably there is a switch in each tube. By reason of the shiftable or movable carrier 13, and the two sets of tubes, one set of tubes is being loaded while the other set of tubes is being operated on and hence, the machine tool can be kept running continuously at rapid speed.

Owing to the connecting of the solenoids 90, 91, 92, in branch circuits 99, 97, 101, of the feed wire 95 through the three position master switch 96, and the connection of the solenoids 93, 94, of the reversing valves 83, 84, in branches of a circuit closeable only by the master switch in vacuum position and by the switches 105 operated by the pistons. Actuation of the reversing motor is delayed until the pistons are in retracted position. The proper sequence of operation is insured as no effective operations can take place unless the control switches 96 and 102 are operated in proper sequence. If the operator should not hold the master switch long enough in central or exhaust position, the exhaust would take place through the vacuum valve 80 when the master switch is shifted to vacuum position.

The operator merely loads the bars in the reserve set of tubes while they are out of alinement with the spindles, and then when the bars in the tubes that are alined with the spindles are used up, moves the master switch 96 from power position, that is from contact with the contact 98 into vacuum position into engagement with the contact 100 to exhaust the air from the tubes and withdraw the pistons to the inner ends of the tubes, and then shifts the reversing valve switch 102, shifting carrier 13 to carry the set of tubes loaded with bars into operating position, and the empty set of tubes out of operating position. He then shifts the master switch from the vacuum position into engagement with the power contact 98.

What I claim is:

1. A bar feed mechanism for machine tools which have a rotating hollow spindle, the feeding mechanism including a carrier, a pair of feed tubes for the bars and push pistons therein, the tubes being secured at like ends to the carrier and having their other ends spaced from the outer end of the hollow spindle and spaced laterally apart from each other, the carrier being mounted to shift to arrange either tube in bar feeding position in alinement with the spindle, and the other in reloading position out of alinement with the spindle, and a system for controlling the flow of air under pressure to either tube when alined with the spindle including an air feed line having branches communicating with the feed tubes respectively, alternately operable self-closing valves in the branches, one operable to open position by the carrier when shifted in one direction to carry one tube into and the other out of spindle alined position, and the other by the carrier when shifted in the opposite direction to carry the other tube into and the first tube out of spindle alined position, and a cut-off valve in the feed line.

2. A bar feed mechanism for machine tools which have a rotating hollow spindle, the feeding mechanism including a carrier, a pair of feed tubes for the bars and push pistons therein, the tubes being secured at like ends to the carrier and having their other ends spaced from the outer end of the hollow spindle and spaced laterally apart from each other, the carrier being mounted to shift to arrange either tube in bar feeding position in alinement with the spindle, and the other in reloading position out of alinement with the spindle, and a system for controlling the flow of air under pressure to either tube when alined with the spindle including an air feed line having branches communicating with the feed tubes respectively, alternately operable self-closing valves in the branches, one operable to open position by the carrier when shifted in one direction to carry one tube into and the other out of spindle alined position, and the other by the carrier when shifted in the opposite direction to carry the other tube into and the first tube out of spindle alined position, and a cut-off valve in the feed line, a vacuum system operable to return the pistons in the tube alined with the spindle when that piston has moved in a feeding direction, the vacuum system including a vacuum feed pipe communicating with the inner ends of the tubes and a self-closing, cut-off valve therein, an operating system for the cut-off valves including branches for the valves respectively, and a master control member common to both cut-off valves and operable into one position to effect the opening of the air cut-off valve only through one branch, and into a second position to open the vacuum valve only through the other branch.

3. A bar feed mechanism for machine tools which have a rotating hollow spindle, the feeding mechanism including a carrier, a pair of feed tubes for the bars and push pistons therein, the tubes being secured at like ends to the carrier and having their other ends spaced from the outer end of the hollow spindle and spaced laterally apart from each other, the carrier being mounted to shift to arrange either tube in bar feeding position in alignment with the spindle, and the other in reloading position out of alinement with the spindle, and a system for controlling the flow of air under pressure to either tube when alined with the spindle including an air feed line having branches communicating with the feed tubes respectively, alternately operable self-closing valves in the branches, one operable to open position by the carrier when shifted in one direction to carry one tube into and the other out of spindle alined position, and the other by the carrier when shifted in the opposite direction to carry the other tube into and the first tube out of spindle alined position, and a cut-off valve in the feed line, a vacuum system operable to return the pistons in the tube alined with the spindle when that piston has moved in a feeding direction, the vacuum system including a vacuum feed pipe communicating with the inner ends of the tubes and a self-closing, cut-off valve therein, an operating system for the cut-off valves including branches for the valves respectively, and a master control member common to both cut-off valves and operable into one position to effect the opening of the air cut-off valve only through one branch, and into a second position to open the vacuum valve only through the other branch, and a system for controlling the shifting of the carrier connected in the valve control system to be effective only when the master control is in vacuum position.

4. A bar feed mechanism for machine tools which have a rotating hollow spindle, the feed mechanism including a carrier, a pair of feed tubes, pistons movable in the tubes, the tubes being secured at like ends to the carrier and having their other ends spaced from the outer end of the hollow spindle and also spaced apart laterally from each other, the carrier being mounted to shift to arrange either tube in alinement with the spindle, and the other out of alinement therewith, means for shifting the carrier to shift the tube in alinement with the spindle out of alinement therewith, and the tube which is out of alinement with the spindle into alinement therewith, including a reversible motor, a control system for controlling the flow of air under pressure to the tube alined with the spindle and the release of air from the other tube, and connecting of the tubes in a retracting vacuum system including a master control member movable selectively into pressure controlling position, into pressure release position, and into vacuum controlling position, power reversing means for controlling the flow of power alternately in opposite directions to the carrier shifting motor, and a reverse control member connected to operate in conjunction with the master control member only when the master control member is in vacuum controlling position.

5. A bar feed mechanism for machine tools which have a rotating hollow spindle, the feed mechanism including a carrier, a pair of feed tubes, pistons movable in the tubes, the tubes being secured at like ends to the carrier and having their other ends spaced from the outer end of the hollow spindle and also spaced apart laterally from each other, the carrier being mounted to shift to arrange either tube in alinement with the spindle, and the other out of alinement therewith, means for shifting the carrier to shift the tube in alinement with the spindle out of alinement therewith, and the tube which is out of alinement with the spindle into alinement therewith, including a reversible motor, an air pressure system including a conduit having branches communicating with the inner ends of the tubes respectively, a self-closing, cut-off valve in the conduit, self-closing, alternately operable valves in the branches, one located to be opened by the carrier when the carrier is shifted in one direction, and the other to be opened by the carrier when the carrier is shifted in the other direction, a pressure release system including a conduit having branches connected to the inner ends of the tubes, and a self-closing exhaust valve in the release conduit, a vacuum system including a vacuum conduit connected to the inner ends of the tubes through the branches of the pressure conduit and having a self-closing, cut-off valve therein, a pressure and release conduit connected to each end of the reversible motor, a self-closing combined intake and exhaust valve in each combined pressure and release conduit normally closed to the flow of intake air under pressure, a feed pipe having branches to the combined intake and exhaust valve, a control system having branches to the cut-off and exhaust valves respectively, and an operating member common to the branches, a control system having branches to the combined intake and exhaust valves respectively, and including an operating member controlled in its effective operation by the former operating member when in position to effect the opening of the vacuum valve only.

6. A bar feed mechanism for machine tools which have a rotating hollow spindle, the feed mechanism including a carrier, a pair of feed tubes, pistons movable in the tubes, the tubes being secured at like ends to the carrier and having their other ends spaced from the outer end of the hollow spindle and also spaced apart laterally from each other, the carrier being mounted to shift to arrange either tube in alinement with the spindle, and the other out of alinement therewith, means for shifting the carrier to shift the tube in alinement with the spindle out of alinement therewith, and the tube which is out of alinement with the spindle into alinement therewith, including a reversible motor, pressure fluid and vacuum conduits connected to the inner ends of the tubes respectively, a self-closing, cut-off valve in each of said conduits, operating systems for the valves including branches, one for each valve, and a valve operating means in each branch, and a master control member common to both branches and operable into one position to effect the operation of the pressure cut-off valve, and into another position to effect the operation of the valve operating means for the vacuum valve.

7. A bar feed mechanism for machine tools which have a rotating hollow spindle, the feed mechanism including a carrier, a pair of feed tubes, pistons movable in the tubes, the tubes being secured at like ends to the carrier and having their other ends spaced from the outer end of the hollow spindle and also spaced apart laterally from each other, the carrier being mounted to shift to arrange either tube in alinement with the spindle, and the other out of alinement therewith, means for shifting the carrier to shift the tube in alinement with the spindle out of alinement therewith, and the tube which is out of alinement with the spindle into alinement therewith, including a reversible motor, pressure fluid and vacuum conduits connected to the inner ends of the tubes respectively, a self-closing, cut-off valve in each of said conduits, operating systems for the valves including branches, one for each valve, and a valve operating means in each branch, and a master control member common t both branches and operable into one position to effect the operation of the valve operating means for the pressure cut-off valve, and into another position to effect the operation of the valve operating means for the vacuum valve, and means controlled by the master control member for operating the carrier shifting means only when the master control member is in position to open the vacuum valve.

8. A bar feed mechanism for machine tools which have a rotating hollow spindle, the feed mechanism including a carrier, a pair of feed tubes, pistons movable in the tubes, the tubes being secured at like ends to the carrier and having their other ends spaced from the outer end of the hollow spindle and also spaced apart laterally from each other, the carrier being mounted to shift to arrange either tube in alinement with the spindle, and the other out of alinement therewith, means for shifting the carrier to shift the tube in alinement with the spindle out of alinement therewith, and the tube which is out of alinement with the spindle into alinement therewith, including a reversible motor, pressure fluid and vacuum conduits connected to the inner ends of the tubes respectively, a self-closing, cut-off valve in each of said conduits, operating systems for the valves including branches, one for each valve, and a valve operating means in each branch, and a master control member common to both branches and operable into one position to effect the operation of the valve operating means for the pressure cut-off valve, and into another position to effect the operation of the valve operating means for the vacuum valve, and means controlled by the master control member and by the pistons when in retracted position only for operating the carrier shifting means only when the master control valve is in position to open the vacuum valve.

BERNARD C. HARNEY.

REFERENCES CITED

The following references are of record in the file of this patent:

UNITED STATES PATENTS

| Number | Name | Date |
|---|---|---|
| 1,986,691 | Uebelhart | Jan. 1, 1935 |
| 2,300,457 | Mariotte | Nov. 3, 1942 |
| 2,331,953 | Andrews et al. | Oct. 19, 1943 |
| 2,433,076 | Weckstein | Dec. 23, 1947 |

FOREIGN PATENTS

| Number | Country | Date |
|---|---|---|
| 443,048 | Great Britain | Feb. 20, 1936 |